United States Patent [19]

Dibattista et al.

[11] 3,901,848

[45] Aug. 26, 1975

[54] STABILIZER SYSTEM OF METAL HYDROXYALKYL PHOSPHONIC ACID, UV ABSORBER AND BENZOATE

[75] Inventors: Anthony Dominic Dibattista, Eastchester; John Denon Spivack, Spring Valley, both of N.Y.

[73] Assignee: Ciba-Geigy Corporation, Ardsley, N.Y.

[22] Filed: May 31, 1973

[21] Appl. No.: 365,802

Related U.S. Application Data

[63] Continuation of Ser. No. 210,610, Dec. 21, 1971, abandoned.

[52] U.S...Cl. 260/45.8 N; 260/45.75 N; 260/45.85 B; 260/45.95 F; 252/406
[51] Int. Cl. ............................................. C08f 45/62

[56] References Cited
UNITED STATES PATENTS

| | | | |
|---|---|---|---|
| 2,464,250 | 3/1949 | Moll et al. | 260/45.85 |
| 2,972,597 | 3/1961 | Newland et al. | 260/45.85 |
| 2,976,259 | 3/1961 | Hardy | 260/45.95 |
| 3,206,431 | 9/1965 | Doyle et al. | 260/45.85 |
| 3,218,294 | 11/1965 | Rodgers et al. | 260/45.75 |
| 3,310,573 | 3/1967 | Spivack | 260/346.3 |
| 3,502,613 | 3/1970 | Berger | 260/45.8 |

*Primary Examiner*—V. P. Hoke
*Attorney, Agent, or Firm*—Nestor W. Shust

[57] ABSTRACT

Compositions containing an organic material normally subject to oxidative deterioration and a hindered phenol metal phosphonate, such as nickel bis[(O-n-butyl-3,5-di-t-butyl-4-hydroxybenzyl)phosphonate], an ultraviolet light absorber such as a benzophenone or a benzotriazole and a light stabilizer such as a p-hydroxybenzoate. Such compositions are stabilized against oxidative, thermal and light deterioration.

9 Claims, No Drawings

STABILIZER SYSTEM OF METAL HYDROXYALKYL PHOSPHONIC ACID, UV ABSORBER AND BENZOATE

This is a continuation of application Ser. No. 210,610, filed on Dec. 21, 1971, now abandoned.

DETAILED DESCRIPTION

This invention related to the stabilization of organic materials normally subject to deterioration by exposure to heat and light by incorporating therein a combination of additives comprising a metal derivative of phenol substituted alkylhydroxyphenylalkylphosphonic acids and phosphonic acid half-esters, an ultraviolet light absorber and an ultraviolet light stabilizer.

The stabilization system of the present invention is useful for stabilizing of organic materials normally subject to oxidative or thermal deterioration. Materials which are thus stabilized include synthetic organic polymeric substances such as vinyl resins formed from the polymerization of vinyl halides or from the copolymerization of vinyl halides with unsaturated polymerizable compounds, e.g., vinyl esters, $\alpha,\beta$-unsaturated aldehydes and unsaturated hydrocarbons such as butadienes and styrene; poly-$\alpha$-olefins such as polyethylene, polypropylene, polybutylene, polyisoprene and the like, including copolymers of poly-$\alpha$-olefins; polyurethanes such as are prepared from polyols and organic polyisocyanates; polyamides such as polyhexamethylene adipamide and polycaprolactam; polyesters such as polymethylene or polyethylene terephthalates; polycarbonates; polyacetals; polystyrene; polyethyleneoxide; and copolymers such as those of high impact polystyrene containing compolymers of butadiene and styrene and those formed by the copolymerization of acrylonitrile, butadiene and/or styrene. Other materials stabilized according to the present invention include lubricating oil of the aliphatic ester type, e.g., di(2-ethylhexyl)-azelate, pentaerythritol tetracaproate and the like; animal and vegetable derived oils, e.g., linseed oil, fat, tallow, lard, peanut oil, cod liver oil, castor oil, palm oil, corn oil, cotton seed oil, and the like; hydrocarbon material such as gasoline, mineral oil, fuel oil, drying oil, cutting fluids, waxes, resins, and the like, fatty acids, soaps and the like.

The metal derivatives of alkylhydroxyphenylalkylphosphonic acid and phosphonic acid half-esters of this invention may be represented by the formula:

$$[J]_m Ni_x [G]_p$$

wherein
G is an anion having an available valence of from 1 to 3; and
J is of the formula:

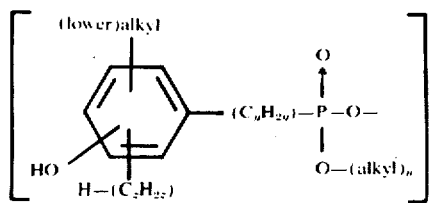

wherein
$z$ has a value of from 0 to 6,
$y$ has a value of from 1 to 4,
$n$ has a value of from 0 to 1,
$m$ has a value of from 1 to 3,
$x$ has a value of from 1 to 2, and
$p$ has a value of from 0 to 3.

The anion G may be organic or inorganic. Illustrative of such organic anions are carboxylate, such as those derived from carboxylic acids containing from 1 to 30 carbon atoms, preferably 2 to 18 carbon atoms, e.g., acetate, laurate, stearate, benzoate, malonate, maleate, succinate, and the like; phenates and alkyl substituted phenates; alkyl- and aryl-sulfates and -sulfonates; alkyl- and arylphosphates and -phosphonates; and inorganic anions such as chloride, bromide, fluoride, nitrate, cyanide, cyanate, sulfate, and the like.

As the embodiments of this invention, mention is made of compounds of the formulae:

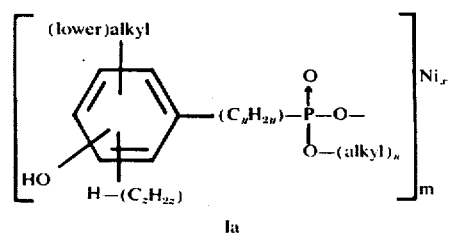

Ia wherein $z$, $y$, $n$, $m$ and $x$ have the values defined above;

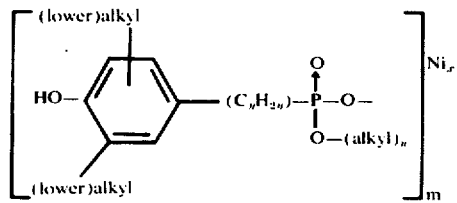

Ib wherein $y$, $n$, $m$ and $x$ have the values defined above; and most preferably

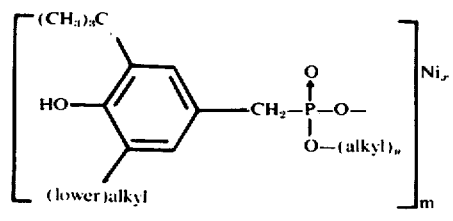

Ic wherein $n$, $m$ and $x$ have the values defined above.

By the term "alkyl" when used in this specification and the appended claims, is intended a branched or straight-chained saturated hydrocarbon group having from 1 to about 30 carbon atoms. When qualified by the term "(lower)", the hydrocarbon chain will contain from 1 to about 6 carbon atoms. Typical of such alkyl groups are thus methyl, ethyl, propyl, isopropyl, butyl, t-butyl, pentyl, isopentyl, hexyl, octyl, t-octyl, decyl, tetradecyl, hexadecyl, octadecyl, eicosyl, docosyl, triacontyl and the like.

The phenyl group of phosphonate moiety is substituted by a hydroxy group and one ($z=0$) or two ($z=1$ to 6) (lower) alkyl groups. These substituents may be located on the phenyl group in a number of ways. From the standpoint of maximizing the antioxidant properties, it is generally desirable to utilize a 3,5-dialkyl-4-hydroxyphenyl arrangement, e.g., 3,5-di-t-butyl-4-hydroxybenzylphosphonate. However, other arrangements such as 2-hydroxy-5-(lower)alkylphenyl are also within the scope of the present invention.

The following formulae, in which R represents the group:

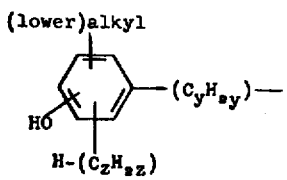

are typical structures of the compounds of this invention without being a limitation thereof:

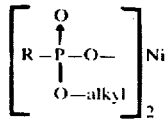 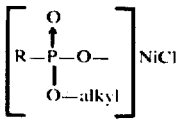

II                     IIa

The nickel phosphonates are prepared by treating a phosphonic acid or half-ester of the formula

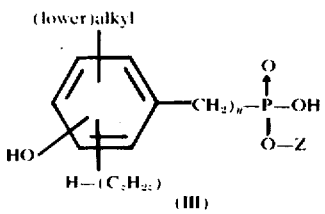

wherein Z is hydrogen or alkyl, with a nickel halide, such as nickel chloride. Generally the product is formed spontaneously or after a short reaction period and need only be freed of by-products, solvents, and unreacted starting material, if any, as by washing and extraction.

Illustrative examples of the metal phosphonates are:
nickel bis(O-butyl 3,5-di-t-butyl-4-hydroxybenzylphosphonate)
nickel bis(O-octadecyl 3-methyl-4-hydroxy-5-t-butylbenzylphosphonate)
nickel bis(O-octadecyl 2-hydroxy-3,5-di-t-butylbenzylphosphonate)
nickel 3,5-di-t-butyl-4-hydroxybenzylphosphonate
nickel bis(O-octadecyl 3,5-di-t-butyl-4-hydroxybenzylphosphonate
nickel (O-n-butyl-3,5-di-t-butyl-4-hydroxybenzylphosphonate)-chloride
nickel (3,5-di-t-butyl-4-hydroxybenzylphosphonate)-acetate
di-nickel-bis-(O-n-butyl-3,5-di-t-butyl-4-hydroxybenzylphosphonate)sulfate
nickel bis(O-ethyl-3,5-dimethyl-4-hydroxybenzylphosphonate)
nickel bis(O-tetracosyl-3,5-diethyl-4-hydroxybenzylphosphonate)
nickel bis(O-triacontyl-3-methyl-4-hydroxybenzylphosphonate)
nickel bis(O-eicosyl-3-hexyl-6-methyl-4-hydroxybenzylphosphonate)
nickel bis(O-methyl-3,5-dihexyl-4-hydroxybenzylphosphonate)
nickel bis(O-octyl-3,6-di-isopropyl-4-hydroxybenzylphosphonate)
nickel bis(O-dodecyl-3-butyl-5-isopropyl-4-hydroxybenzylphosphonate)
nickel bis(O-decyl-5-t-butyl-4-hydroxybenzylphosphonate)

Ultraviolet light absorbers that are employed in this invention are (a) benzophenones and (b) benzotriazoles.

a. The benzophenones have the general formula

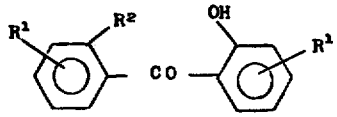

wherein
$R^1$ is hydrogen, hydroxy group, halogen, lower alkyl group or alkoxy group having from 1 to 12 carbon atoms, and
$R^2$ is hydrogen, hydroxy or alkyl from 1 to 12 carbon atoms.

in a preferred embodiment $R^1$ is hydrogen and $R^2$ is a straight chain alkyl group having from 8 to 12 carbon atoms. Illustrative examples of the above described benzophenones are listed below.
2-Hydroxy-4-methoxybenzophenone
2,2'-Dihydroxy-4-methoxybenzophenone
2-Hydroxy-4-methoxy-2'-carboxybenzophenone
2,2-Dihydroxy-4-n-octoxybenzophenone
2-Hydroxy-4-n-octoxybenzophenone
5-Chloro-2-hydroxybenzophenone
2,4-Dihydroxybenzophenone
4-Dodecyloxy-2-hydroxybenzophenone
2-Hydroxy-4-decyloxylbenzophenone
2,2'-Dihydroxy-4,4'-dimethoxybenzophenone
2,2',4,4'-Tetrahydroxybenzophenone b. The Benzotriazoles have the general formula

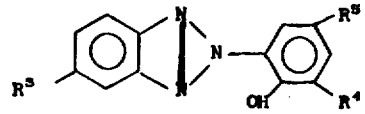

wherein
$R^3$ is hydrogen, halogen or lower alkyl
$R^4$ is hydrogen, chloride, lower alkyl, cycloalkyl or phenyl lower alkyl
$R^5$ is alkyl from 1 to 12 carbon atoms, cycloalkyl or phenyl lower alkyl
such that the sum of the atomic weights of the atoms contained in groups $R^3$, $R^4$ and $R^5$ is at least 107.

In a more preferred embodiment, $R^3$ is hydrogen, chloride or methyl group; $R^4$ is hydrogen, chloride, t-butyl, t-amyl, cyclohexyl, benzyl or α-phenylethyl group; and $R^5$ is alkyl from 1 to 12 carbon atoms, cyclohexyl, benzyl or α-phenylethyl group. Illustrative examples of benzotriazoles employed in this invention are listed below.

2(2'-hydroxy-5'-methylphenyl)-benzotriazole
2-(2'-hydroxy-5'-methylphenyl)-benzotriazole-5-carboxylic acid butyl ester
2-(2'-hydroxy-5'-tert.butylphenyl)-5-chlorobenzotriazole
2-(2'-hydroxy-5'-amylphenyl)-benzotriazole
2-(2'-hydroxy-5'-tert.butylphenyl)-benzotriazole
2-(2'-hydroxy-3',5'-dimethyl-phenyl)-benzotriazole
2-(2'-hydroxy-3',5'-dimethyl-phenyl)-5-methoxy-benzotriazole
2-(2'-hydroxy-3',5'-dimethyl-phenyl)-5-methyl-benzotriazole
2-(2'-hydroxy-5'-methylphenyl)-benzotriazole
2-(2'-hydroxy-5'-tert.butyl-phenyl-5-chlorobenzotriazole
2-(2'-hydroxy-5'-amylphenyl)benzotriazole
2-(2'-hydroxy-5'-tert.butylphenyl)benzotriazole
2-(2'-hydroxy-5'-methoxy-phenyl)-benzotriazole
2-(2'-hydroxy-5'-methyl-phenyl)-5,6-dichlorobenzotriazole
2-(2'-hydroxy-5'-phenyl-phenyl)-5-chlorobenzotriazole
2-(2'-hydroxy-5'-cyclohexyl-phenyl)-5-chlorobenzotriazole
2-(2'-hydroxy-5'-cyclohexyl-phenyl)-benzotriazole
2-(2'-hydroxy-3',5'-dichlorophenyl)-benzotriazole
2-(2'-hydroxy-4',5'-dichlorophenyl)-benzotriazole
2-(2'-hydroxy-5'-phenyl-phenyl)-benzotriazole
2-(2'-hydroxy-5'-methoxy-phenyl-5-methyl-benzotriazole The third additive in this invention is a p-hydroxybenzoate having the general formula

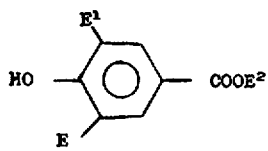

wherein
E is lower alkyl or cycloalkyl group
E¹ is hydrogen, lower alkyl or cycloalkyl group, and
E² is alkyl from 1 to 20 carbon atoms, phenyl, lower alkyl substituted phenyl, benzyl or lower alkyl substituted benzyl groups, such that no more than two lower alkyl substituents are present on said phenyl or benzyl groups.

In a preferred embodiment, E and E¹ are t-butyl or t-amyl groups and E² is a di(lower alkyl)phenyl. Illustrative examples of hydroxybenzoates are given below.

(2',4'-di-t-butylphenyl)-3,5-di-t-butyl-4-hydroxybenzoate
methyl 3-methyl-5-isopropyl-4-hydroxybenzoate
ethyl 3,5-diisopropyl-4-hydroxybenzoate
propyl 3,5-di-sec-butyl-4-hydroxybenzoate
isobutyl 3,5-di-tert-amyl-4-hydroxybenzoate
decyl 3,5-di-tert-octyl-4-hydroxybenzoate
cyclohexyl 3,5-di-tert-amyl-4-hydroxybenzoate
dodecyl 3-methyl-5-isoamyl-4-hydroxybenzoate
octadecyl 3,5-diisopropyl-4-hydroxybenzoate
hexadecyl 3,5-di-tert-butyl-4-hydroxybenzoate
chloromethyl 3,5-di-tert-butyl-4-hydroxybenzoate
3-fluoropropyl 3,5-di-tert-amyl-4-hydroxybenzoate
allyl 3,5-di-tert-butyl-4-hydroxybenzoate
2-butenyl 3,5-diisopropyl-4-hydroxybenzoate
oleyl 5-methyl-5-tert-amyl-4-hydroxybenzoate
ethane-1,2 di(3,5-diisopropyl-4-hydroxybenzoate)
tetramethylene-1,3 di(3,5-di-tert-amyl-4-hydroxybenzoate)
pentamethylene-1,5 di(3,5-di-tert-octyl-4-hydroxybenzoate)
hexamethylene-1,5 di(3-methyl-5-tert-butyl-4-hydroxybenzoate)
2-chloropropane-1,3 di(3,5-di-tert-butyl-4-hydroxybenzoate)
phenyl 3,5-diisopropyl-4-hydroxybenzoates
p-octylphenyl 3,5-di-tert-amyl-4-hydroxybenzoate
(2',4'-dimethylphenyl)-3,5-di-tert-octyl-4-hydroxybenzoate
p-isopropylphenyl 3-methyl-5-tert-amyl-4-hydroxybenzoate
naphthyl 3,5-di-tert-butyl-4-hydroxybenzoate
6-methylnaphthyl 3,5-di-tert-hexyl-4-hydroxybenzoate
p-chlorophenyl 3,5-di-tert-butyl-4-hydroxybenzoate
2,4-dibromophenyl 3,5-diisopropyl-4-hydroxybenzoate The above described additives can be added to substrates in various concentrations. The nickel phosphonate can be used in a concentration of from about 0.001 to 10% by weight of the organic material, and more preferably from about 0.05 to 2%. The ultraviolet light absorber (benzophenone or benzotriazole) can be employed in the concentration of from about 0.01 to 10%, and more preferably from about 0.05 to 3%. The light stabilizer (p-hydroxybenzoate) can be used in the concentration of from about 0.01 to 5%, and more preferable from 0.05 to 2%. However, for some special applications said additives can be used both in higher and lower concentrations than those noted above.

Based on the above concentrations, the relative ratios of the three components can also be expressed as follows:

a. nickel phosphonate: 1 to 40 parts by weight,
b. ultraviolet light absorber: 1 to 60 parts by weight,
c. light absorber: 1 to 40 parts by weight.

To further illustrate the instant invention there are presented below illustrative examples. These examples in no way limit the scope of the invention.

EXAMPLE 1

Outdoor Exposure Tests a. Sample Preparation

15 Denier Oriented Multifilaments

The additives are dissolved in distilled methylene chloride and blended with polypropylene (Hercules Profax 6501) in a Hobart mixer. A Buffer (such as calcium stearate) and a pigment (such as titanium dioxide) are added dry to the polymer blend. To facilitate moisture removal all blends are vacuum dried shortly before extrusion.

Samples were precessed as follows:
1. Compounding and Pelletizing
1" Extruder - L/D = 20/1 at 40 rpm
Melt Temperature - 450°F.
2. Multifilament
1" Extruder - L/D = 24/1 at 20 rpm
Spinnerette - 10 hole, 20 mil diameter/hole
Melt Temperature - 500°F.

Air cooling was accomplished by spinning into a cooling tower 6′ × 6″ × 5″ fitted with a fan delivering 65 cfm. of air.

3. Filament Take-up

The cooled multifilament was wound on Godet rolls at a filament speed of 500 ft/min.

4. Orientation

Godet Temperature - 257°F.

Orientation Ration - 3:1 b. Test Methods for Weathering Stability

Mockdyed knitted multifilament was exposed 45° south direct in Florida. Exposures were begun November 1. Tensile measurements were performed at each exposure interval with the Instron Model TM.

The test results reported below show the percentage of retention of the original tensile strength by a fiber after having been exposed to the indicated number of Kilolangleys (Kly). A Langley is a measure of eneryl accumulated by the fiber. It is common that some fibers after initial exposure increase their orientation. For this reason the percent of retention of tensile strength increases after the initial decrease.

Polypropylene filaments containing the following additives were prepared as described above:

0.20% Nickel bis [(O-n-butyl-3,5-di-t-butyl-4-hydroxybenzyl)phosphonate]
0.25% 2,4-di-t-butylphenyl-3,5-di-t-butyl-4-hydroxybenzoate
0.55% 2(2′-hydroxy-3′,5′-di-t-butylphenyl-7-chlorobenzotriazole The test results were as follows:

| 20 Kly. | — | 69% |
| 40 Kly. | — | 82% |
| 50 Kly. | — | 84% |
| 60 Kly. | — | 71% |
| 70 Kly. | — | 82% |
| 80 Kly. | — | 82% |
| 90 Kly. | — | 64% |
| 100 Kly. | — | 58% |

Similar results are obtained when in the above example 2(2′-hydroxy-3′,5′-di-t-butylphenyl-7-chlorobenzotriazole is replaced with 2(2′-hydroxy-5′-methylphenyl)benzotriazole
2(2′-hydroxy-5′-carbethoxyphenyl)benzotriazole
2(2′-hydroxy-5′-phenylphenyl)-5-chlorobenzotriazole
2-hydroxy-4-methoxybenzophenone
2-hydroxy-4-n-octoxybenzophenone

EXAMPLE 2

Polyethylene is stabilized with the following composition:

| 0.05% | O-n-Butyl-chloronickel-3,5-di-t-butyl-4-hydroxybenzyl phosphonate |
| 0.05% | 2,4-Dihydroxybenzophenone |
| 0.05% | Methyl 3-methyl-5-isopropyl-4-hydroxybenzoate |

Equally good stabilization is achieved when in the above Example said nickel compound is replaced with nickel bis(O-octadecyl 2-hydroxy-3,5-di-t-butylbenzylphosphonate nickel bis(O-butyl 3,5-di-t-butyl-4-hydroxybenzylphosphonate

EXAMPLE 3

Polybutene is stabilized with the following composition:

| 2.0% | Nickel 3,5-dimethyl-4-hydroxybenzyl-phosphonate |
| 0.2% | 2(2′-Hydroxy-3′,5′-dimethylphenyl)-5-methylbenzotriazole |
| 0.1% | Methyl 3,5-di-t-butyl-4-hydroxybenzoate |

EXAMPLE 4

Polypropylene is stabilized with the following additives:

| 0.5% | 2(2′-Hydroxy-3′,5′-di-t-butylphenyl)-7-chlorobenzotriazole |
| 0.5% | Nickel bis[(O-n-butyl-3,5-di-t-butyl-4-hydroxybenzyl)phosphonate] |
| 0.5% | 2,4-Di-t-butylphenyl-3,5-di-t-butyl-4-hydroxybenzoate |

EXAMPLE 5

Polypropylene is stabilized with the following additives:

| 0.5% | 2(2′-Hydroxy-3′,5′-di-t-butylphenyl)-7-chlorobenzotriazole |
| 0.5% | O-n-Butyl-chloronickel-3,5-di-t-butyl-4-hydroxybenzyl phosphonate |
| 0.2% | dodecyl 3-methyl-5-isoamyl-4-hydroxybenzoate |

EXAMPLE 6

Butadiene-styrene-acrylonitrile copolymer is stabilized with

| 2.0% | Nickel (3,5-di-t-butyl-4-hydroxybenzyl-phosphonate)acetate |
| 0.1% | 2-Hydroxy-4-methoxy-2′-carboxybenzophenone. |
| 0.1% | 3,5-Diisopropyl-4-hydroxybenzoate. |

Similar stabilization is obtained when poly 4-methylpentene-1 is employed as the polymer in Example 6.

EXAMPLE 7

Nylon pellets are blended with:

| 0.25% | Nickel bis[(O-n-butyl-3,5-di-t-butyl-4-hydroxybenzyl)phosphonate |
| 0.5% | Pentamethylene-1,5-di(3,5-di-t-octyl-4-hydroxybenzoate |
| 0.1% | 2,2′,4,4′-Tetrahydroxybenzophenone |

What is claimed is:

1. A stabilizing composition consisting essentially of
a. from 1 to 40 parts by weight of nickel hydroxyalkyl phosphonate having the formula

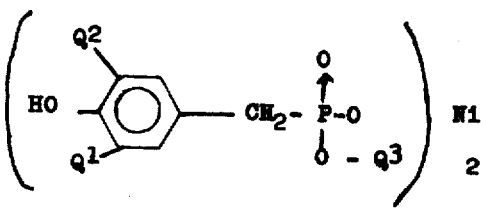

wherein
Q$^1$ is lower alkyl or cycloalkyl
Q$^2$ is hydrogen, lower alkyl or cycloalkyl; and
Q$^3$ is lower alkyl
b. from 1 to 60 parts by weight of benzotriazole having the formula

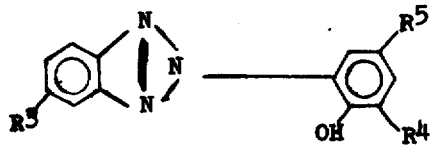

wherein
R$^3$ is hydrogen, halogen or lower alkyl
R$^4$ is hydrogen, chloride, lower alkyl, cycloalkyl or phenyl lower alkyl,
R$^5$ is alkyl from 1 to 12 carbon atoms, cycloalkyl or phenyl lower alkyl such that the sum of the atomic weights of the atoms contained in groups R$^3$, R$^4$ and R$^5$ is at least 107; and
c. from 1 to 40 parts by weight of p-hydroxybenzoate having the formula

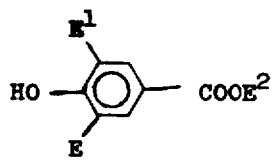

wherein
E is lower alkyl or cycloalkyl group,
E$^1$ is hydrogen, lower alkyl or cycloalkyl group, and
E$^2$ is alkyl from 1 to 20 carbon atoms, phenyl, lower alkyl substituted phenyl, benzyl or lower alkyl substituted benzyl groups, such that no more than two lower alkyl substituents are present on said phenyl or benzyl groups.

2. A composition of claim 1 wherein
a. Q$^1$ and Q$^2$ are tertiary butyl or tertiaryl amyl groups,
b. R$^3$ is hydrogen, chloride or methyl group,
R$^4$ is hydrogen, chloride, t-butyl, t-amyl, cyclohexyl, benzyl or α-phenylethyl group,
R$^5$ is alkyl having from 1 to 12 carbon atoms, cyclohexyl, benzyl or α-phenylethyl group and
c. E and E$^1$ are tertiary butyl or tertiary amyl groups and
E$^2$ is di(lower alkyl)phenyl group.

3. A composition of claim 2 wherein
a. said nickel hydroxyalkyl phosphonate is nickel bis.

4. A composition of claim 2 wherein
a. said nickel hydroxyalkyl phosphonate is nickel bis,
b. said ultraviolet light absorber is 2(2'-hydroxy-3',5'-di-t-butylphenyl)-7-chlorobenzotriazole
c. said p-hydroxybenzoate is 2,4-di-t-butylphenyl-3,5-di-t-butyl-4-hydroxybenzoate.

5. A stabilized polymer composition comprising a polyolefin containing a composition of claim 1 in the amount from 0.15 to 7%.

6. A stabilized polymer composition comprising a polyolefin containing a composition of claim 2 in the amount from 0.15 to 7%.

7. A stabilized polymer composition comprising a polyolefin containing the composition of claim 4 in the amount of from 0.15 to 7%.

8. A composition of claim 7 wherein said polyolefin is polyethylene or polypropylene or poly 4-methylpentene-1.

9. A composition of claim 2 wherein
a. said nickel hydroxyalkyl phosphonate is nickel bis-0-ethyl-3,5-di-t-butyl-4-hydroxybenzyl)phosphonate
b. said ultraviolet light absorber is
2(2'-hydroxy-3',5'-di-t-butylphenyl)-5chlorobenzotriazole
c. said p-hydroxybenzoate is 3,5-di-t-butyl-4-hydroxybenzoate.

* * * * *